Oct. 6, 1936.   R. COHEN   2,056,419
BURIAL VAULT
Filed Nov. 20, 1934   2 Sheets-Sheet 1

INVENTOR
RALPH COHEN.
BY Robb & Robb
ATTORNEYS

Oct. 6, 1936.    R. COHEN    2,056,419
BURIAL VAULT
Filed Nov. 20, 1934    2 Sheets-Sheet 2
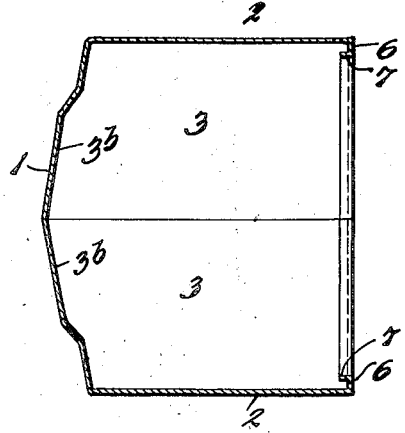
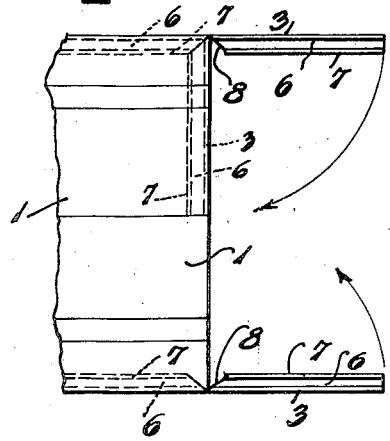
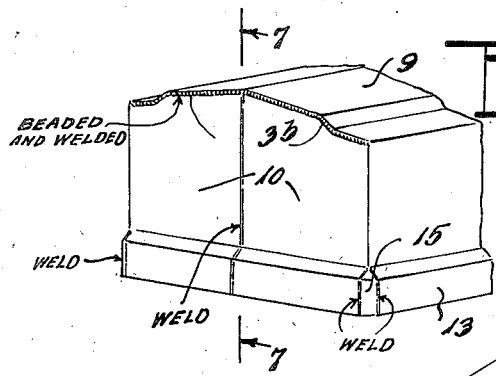
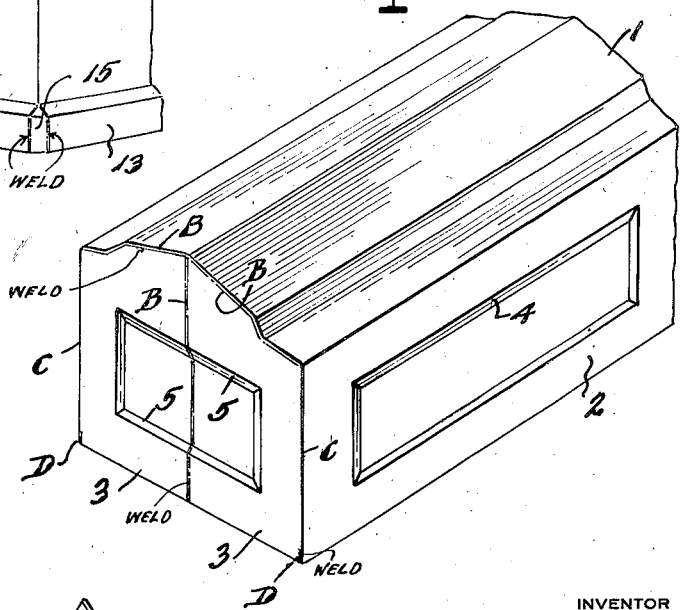
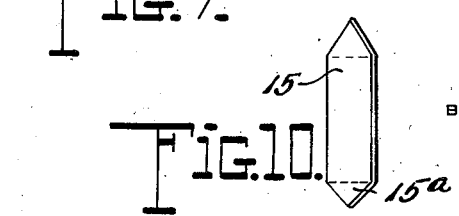
INVENTOR
RALPH COHEN.
BY
ATTORNEYS Patented Oct. 6, 1936

2,056,419

UNITED STATES PATENT OFFICE 2,056,419

BURIAL VAULT

Ralph Cohen, Galion, Ohio, assignor to Perfection Steel Body Company, Galion, Ohio, a corporation Application November 20, 1934, Serial No. 753,953

1 Claim. (Cl. 27—35)

The present invention appertains to the art of manufacture of grave vaults or enclosures of a similar nature, the primary objective in view being to simplify and cheapen the cost of production of such vaults as compared with a common method at present in vogue. This common method involves the making of the vault or enclosure body in three pieces, namely, a central body blank which is bent to provide the sides and top, and two end blanks which are caused to abut at their upper and side edges with the end edges of the sides and top of the body blank and welded at these portions.

Under practical conditions of manufacture, the said common method necessitates the provision of relatively long lines of continuous welding at the meeting edges of the ends with the intermediate body section of the vault. The welding must be accurately done for these vaults are required to be air and water-tight when completed and ready for use. The greater the welding areas or lines, the greater will be the rust attacking area, moreover, unless some special provision is made to coat the welded areas for protection against rust.

Now in carrying out my invention, I contemplate the employment of a single metal blank cut to shape so as to provide in one integral piece the top, sides and ends of the vault. The ends form extensions of the flat metal blank made initially and from which the single-piece vault will be built of conformed required shape. The entire vault of the present invention, so far as the formation of the ends and intermediate body is concerned, provides for the application of mere bending operations for the purpose of properly uniting the ends with the intermediate body portion which comprises the sides and top. By the construction employed according to the invention I am enabled to reduce the length of the welded areas or lines between the ends and top and sides of the vault substantially fifty per cent. The advantage of such reduction in the welded area is obvious from the foregoing and the economies effected are likewise obvious.

My invention involves, furthermore, the peculiar cutting of the blank of metal from which the vault of the invention is made, said vault, according to its preferred embodiment, comprising a base edge sealing flange carried by the lower edges of the sides and ends. Due to the provision of this flange, a special formation of the metal blank from which the integral one-piece vault is made, is required, so that the abutting edges of the ends and the sides at the base sealing flange portions will come together properly when the bending operation to turn the end extensions to a position at right angles to the sides and top is performed.

The preferred method of carrying out the invention is illustrated in the accompanying drawings in reference to certain preferred adaptations of the invention, though it will be understood that the principles of blanking out the metal and bending the same, for the purpose of forming a unitary one-piece vault or enclosure, may equally well be carried out in conjunction with certain specific shapes of vaults other than those particularly presented by the drawings.

Referring to the drawings—

Figure 3 is a transverse sectional view showing how the ends of the vault are bent to meeting contact at contiguous vertical edges, the vault being illustrated on its sides so that these normally vertical edges appear horizontal in the illustration.

Figure 4 is a view looking down upon a fragmentary end portion of the vault and showing how the end extensions from the sides of the main blank are to be bent to bring them into alignment, the arrows showing the direction of bending. This view also shows the manner of cutting out the sealing flange portions of the base edges of the sides and ends so they will properly abut when the ends are bent into their final normal relation to the sides.

Figure 5 is a fragmentary perspective view of an end portion of the vault as it appears when the end sections of the blank have been bent to form the end in proper relation to the sides and top.

Figure 6 is a view somewhat similar to Figure 5 but illustrating a modification of the invention wherein the top B slightly overlaps the top edge of the end sections of each end portion or member, and wherein the corners are provided with welded gusset plates at the base extension or protuberance of the body.

Figure 7 is a sectional view on the line 7—7 of Figure 6.

Figures 8, 9:
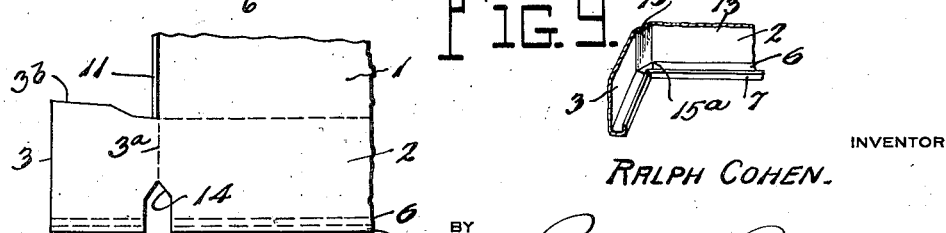

Figure 8 is a fragmentary view of a corner portion of the main blank as it is cut out for making the vault of the type of Figure 6.

Figure 9 illustrates the inside view of the lower corner portion of the structure of Figure 6 showing the gusset plate as seen finally placed in position and welded adjacent the sealing flange.

Figure 10 is a perspective view of one of the corner gusset plates.

Figure 1:
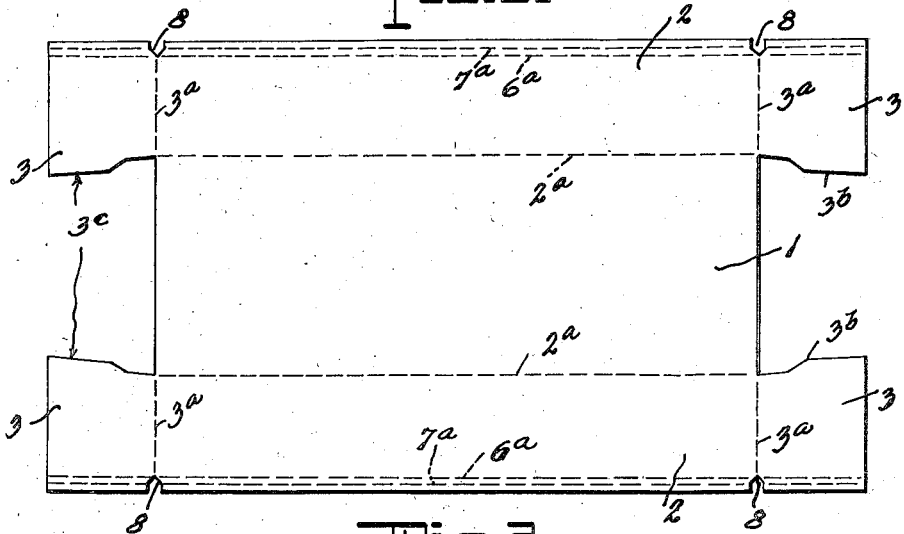
Figure 1 shows in flat original condition the single metal blank from which a vault according to one of the forms of my invention may be made.
Figure 2:
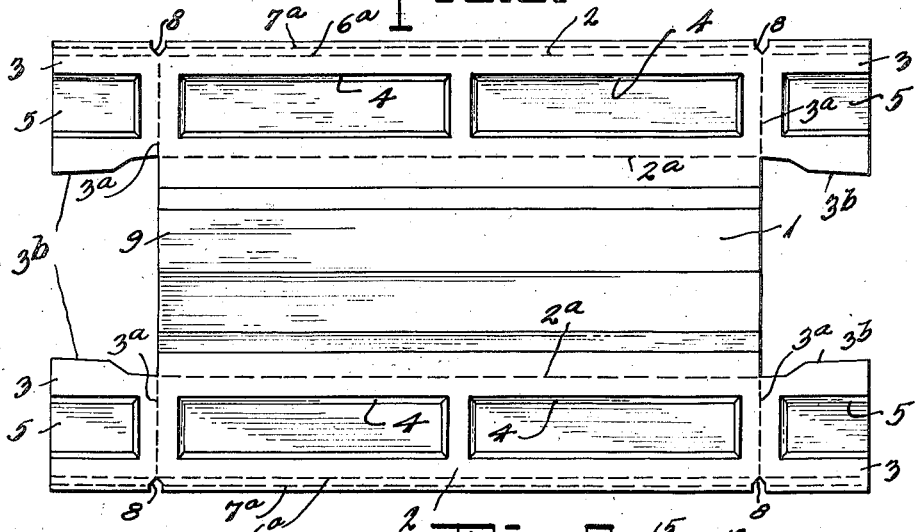
Figure 2 is a view of the same blank as shown in Figure 1 after the blank has been subjected to pressure to draw into shape certain panels that will form the part of the final vault design.

Referring first to Figures 1 and 2, it is notable that the body of my vault is made from a single blank of metal which may be divided into areas or sections as separated by dotted lines in the illustration, the same consisting of a top section 1, side sections 2, and end sections 3 at opposite ends of the side sections 2. The bending lines at which the sides 2 project downwardly from the top are indicated at 2a and the bending lines at which the end sections 3 project from the sides 2 are indicated at 3a.

If it is desirable, according to the final design of the vault, that the said design embody the inset or protuberant panels such as 4 on the sides, and 5 at the ends, the full panels 4 will be formed by pressure and drawing of the metal of the original blank after said blank has been cut out in the manner shown in Figure 1, and the full panels for the ends of the vault will be pressed out in half-panel formation as shown at 5 in Figure 2, the half-panels coming together to make the full panels when the final bending operations are completed and the welding operation correspondingly completed.

As is seen in Figure 3 and in Figure 7, the latter a modification construction, the lower or base edge portions of the vault are equipped with sealing flanges 6 mounted to cooperate with a base which forms a bottom of the vault when it is finally closed with a casket therein and locked ready to be emplaced and buried in the grave. The sealing flange 6 consists merely of an ornamental flange section projecting inwardly from the sides 2 and end sections 3 of the blank of Figure 1, from which horizontal flange is bent upwardly a vertical flange 7.

The formation of these flanges on the bending lines 6a and 7a, as shown in Figure 1, presents certain difficulties in bringing the portions of the flanges on the end sections and the side sections together in the bending operation. These difficulties are overcome by forming notches 8 in the outer edges of the blank of Figure 1, said notches being cut on an incline through the area of the horizontal flange 6 and cut on straight lines through the area of the vertical flange 7. Thus when the end sections 3 of the blank are bent laterally to the side sections 2, as illustrated in Figure 4 by the direction arrows, the notches 8 will permit the abutting portions of the flanges 6 and 7 at the bending angles to come together at a proper angle when the parts 3 have been finally bent in position at right angles to the parts 2.

For a vault of the top conformation illustrated in Figure 5, the inner edges 3b of the end sections or extensions 3 of the blank of metal are cut away on curved lines. Thus when the top section 1 is bent to the conformation of Figure 5, the peculiarly curved edges 3b will conform with the curvature of the top as it is finally pressed out or bent, and the said edges 3b will accurately fit or conform to the said curvature of the top, making necessary only the welding operation to complete the joinder between the end sections 3 themselves and between said end sections at their edges 3b and the top portion of the vault. Figure 5 illustrates at B the edge portions at each end of the vault, in respect to abutting edges of the end sections 3 and in respect to abutting edges between the end sections 3 and the top 1, at which the welding lines will be made. In this same figure at C are designated the corner portions at which the welding lines or areas are not required owing to the peculiar manner of bending the ends from the blank of metal from which the top and sides are formed. Of course the welding lines will continue throughout the meeting edges of the portions of the sides and ends at the sealing channel formed by the flanges 6 and 7, and, as shown in Figure 5 at D, the said welds may extend an inch or two up the lines of the corner portions C.

In Figures 6 to 10 inclusive the modification of the invention follows generally the form of construction previously set forth, with certain detail exceptions now to be pointed out. In this form, as shown best in Figure 7, the top 9 will be slightly longer in extent in reference to the section thereof in the original metal blank than the corresponding portion 1 illustrated in Figures 1 and 2, in order that at the end edges of said top portion 9 the same may be slightly rolled over the outer side of the end sections 10 to provide an abutment bead 11 really interlocking against the outer sides of the parts 10 at their upper edges. The welding line or area in this construction is shown at 12. Now in this modified form the corners of the protuberant base 13 are specially made by a cutting out of notches 14, as seen best in Figure 8, in respect to the original metal blank. The notched portion 14 extends the height of the protuberant portion 13 at the base of the vault and also through the area of the sealing portion comprising the flanges 6 and 7, previously mentioned.

The formation of the notches 14 permits the proper bending of the corner portions of the base 13 of the vault of the type of Figure 6 construction, and it is preferred, when the bending operation is completed, to insert in the notch portion 13, gusset plates 15 which are welded in place after the manner illustrated by the inside corner view of Figure 9. The lower triangular extremity 15a of the gusset plate 15 occupies the space between the notch cut-out portions of the horizontal flange 6 in a manner that will be clearly apparent.

Having thus described my invention, what I claim as new and desire to secure by Letters Patent of the United States, is—

In burial vault construction, a vault body made from a single metal blank which in flat condition comprises a top section from which are bendable downwardly the side sections, said side sections having extensions to provide end members, the facing edges of said extensions at each end of the side sections being cut and shaped to conform with and abut accurately with the end edges of the top section when the said end members are bent at right angles toward each other beneath the top section so that the end edges of the end members assume a vertical position in substantial vertical contact with each other along a medial vertical line for the end of the vault which comprises said end extensions when so bent, said structure affording a one-piece bendable unit with integral ends therefor, the side sections and the outermost portions of the end members of the blank of metal from which the vault is made being provided with a protuberant base bent therefrom and formed at the lower edge portions of said parts with a sealing flange consisting of a horizontal flange projecting from the side sections and end members, and a vertical flange projecting from said horizontal flange portions of the side sections and end members, the area of said protuberant base over that portion at the corners coincident with the height of said protuberant base and coincident with the thickness of the horizontal flange of the sealing member being cut out, and gusset plate inserts welded at said corner portions of the protuberant base to occupy the cut out areas aforesaid.

RALPH COHEN.